(12) United States Patent
Taguchi

(10) Patent No.: US 9,292,771 B2
(45) Date of Patent: Mar. 22, 2016

(54) IMAGE FORMING APPARATUS, AND METHOD CAPABLE OF COMPOSITING COLOR IMAGES WITH A UNIT THAT COLOR-CONVERTS AND THEN COMPRESSES EACH OF THE PLURALITY OF PIECES OF IMAGE DATA

(71) Applicant: KYOCERA Document Solutions Inc., Osaka-shi, Osaka (JP)

(72) Inventor: Masanori Taguchi, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 14/666,335

(22) Filed: Mar. 24, 2015

(65) Prior Publication Data

US 2015/0278664 A1    Oct. 1, 2015

(30) Foreign Application Priority Data

Mar. 25, 2014  (JP) ................................. 2014-062273

(51) Int. Cl.
*G06K 1/00*    (2006.01)
*G06K 15/02*    (2006.01)

(52) U.S. Cl.
CPC ........ *G06K 15/1851* (2013.01); *G06K 15/1856* (2013.01); *G06K 15/1861* (2013.01)

(58) Field of Classification Search
None
See application file for complete search history.

(56) References Cited

U.S. PATENT DOCUMENTS

| 5,454,051 A * | 9/1995 | Smith | G06T 5/002 |
| | | | 375/E7.14 |
| 7,929,175 B2 * | 4/2011 | Ishii | H04N 1/2369 |
| | | | 358/1.16 |
| 8,401,320 B2 * | 3/2013 | Watanabe | H04N 1/41 |
| | | | 382/244 |

FOREIGN PATENT DOCUMENTS

JP    2013126117 A    6/2013

* cited by examiner

*Primary Examiner* — Steven Kau

(57) ABSTRACT

An image forming apparatus is capable of compositing a plurality of pieces of image data. The image forming apparatus includes a color conversion and compression unit, an expansion and composition unit, and an image forming unit. The color conversion and compression unit color-converts and then compresses each of the plurality of pieces of image data in units of band data, the band data being part of the image data. The expansion and composition unit expands and composites, in units of the band data, the plurality of pieces of image data color-converted and then compressed in units of the band data by the color conversion and compression unit. The image forming unit forms an image on the basis of the band data composited by the expansion and composition unit.

2 Claims, 7 Drawing Sheets

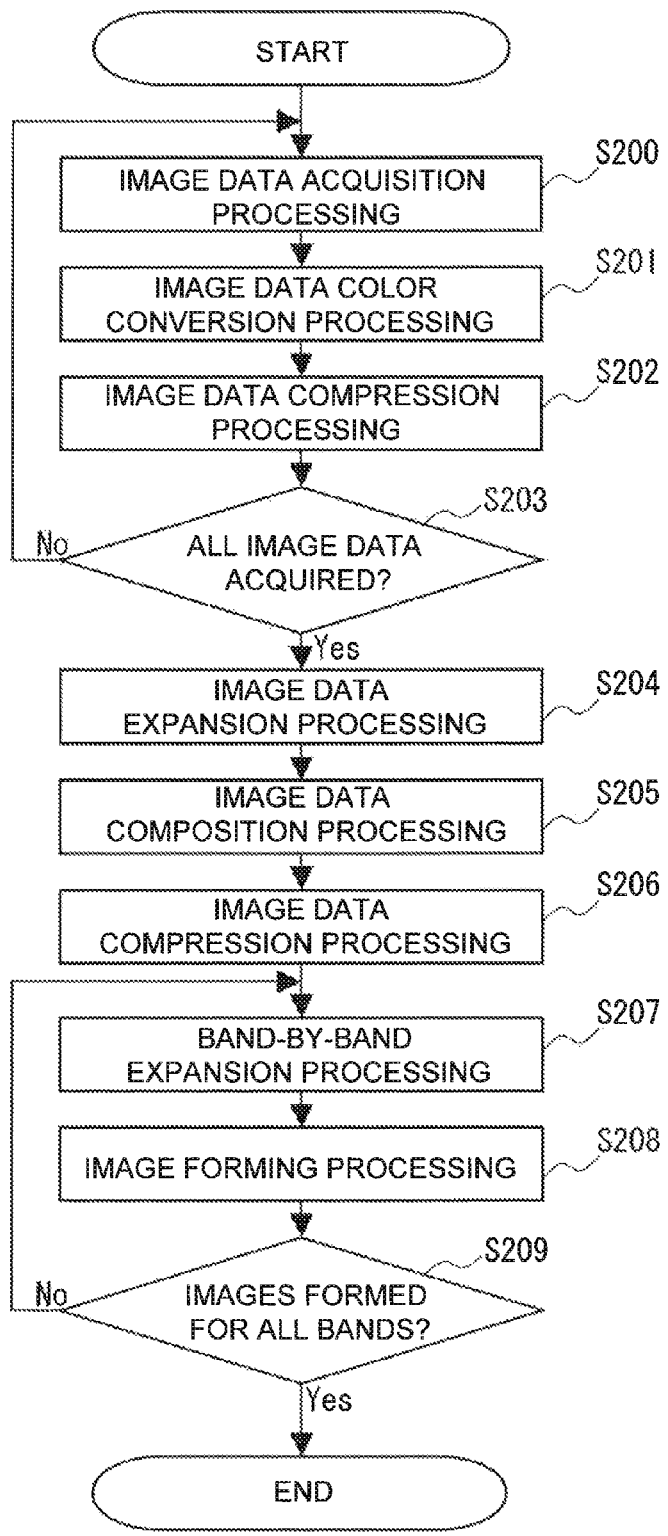

IMAGE FORMING APPARATUS, AND METHOD CAPABLE OF COMPOSITING COLOR IMAGES WITH A UNIT THAT COLOR-CONVERTS AND THEN COMPRESSES EACH OF THE PLURALITY OF PIECES OF IMAGE DATA

INCORPORATION BY REFERENCE

The disclosure of Japanese Patent Application No. 2014-62273 filed on Mar. 25, 2014 including the specification, drawings and abstract is incorporated herein by reference in its entirety.

BACKGROUND

The present disclosure relates to image forming apparatuses, image forming methods, and image forming programs, and more particularly to an image forming apparatus capable of compositing a plurality of images, and an image forming method and program performed by the apparatus.

Conventionally, there have been image forming apparatuses, such as multifunctional peripherals (MFPs) and printers, capable of printing text and images.

Some of the image forming apparatuses are able to composite a plurality of images.

FIG. 6 shows, as a typical example of image composition, the case where image data 300a of a form such as a sales slip and image data 300b of a document with actual numerical values written thereon are composited to generate image data 310 during the use of a copying function of an image forming apparatus.

For compositing images while using the copying function as described above, an image of the form is scanned first and an image of the document is scanned next, and then the two images are superposed on one another for printing them as a single image.

Typical image composition processing will be described with reference to FIG. 7.

First, image data 300a of a form is acquired from a scanner (step S200). This form image data 300a is subjected to color conversion by an application-specific integrated circuit (ASIC) (step S201). The color-converted image data 300a is compressed by another ASIC, and then stored in a RAM in a storage unit (step S202). Next, it is determined whether all pieces of image data have been acquired. Here, it is necessary to scan a document to be composited, so the process returns to step S200 ("No" in step S203). The document image data 300b is then acquired (step S200). This document image data is also subjected to color conversion by the ASIC (step S201). The image data 300b of the document image that has undergone the color conversion is also compressed (step S202). Next, it is determined whether all pieces of image data have been acquired. Here, the image data of the form and that of the document have both been acquired, so the process proceeds to step S204 ("Yes" in step S203). Next, the form image data 300a and the document image data 300b, which are to be composited, are expanded (step S204). The resultant pieces of image data are composited by the ASIC on a per-image-data basis, whereby composited image data 310 is generated (step S205). Next, the composited image data 310 is compressed (step S206). Thereafter, the compressed image data 310 is expanded on a band-by-band basis (step S207), the "band" being a unit of data that an image forming unit can process at a time to form an image thereof. Next, on the basis of the expanded band data, an image is formed on a sheet of recording paper by the image forming unit (step S208). It is then determined whether images have been formed for all bands (step S209). If so ("Yes" in step S209), the process is terminated; otherwise ("No" in step S209), the process returns to step S207.

Further, an example of such an image forming apparatus capable of compositing images has been disclosed conventionally.

SUMMARY

In an aspect of the present disclosure, an image forming apparatus is capable of compositing a plurality of pieces of image data. The image forming apparatus includes a color conversion and compression unit, an expansion and composition unit, and an image forming unit. The color conversion and compression unit color-converts and then compresses each of the plurality of pieces of image data in units of band data, the band data being part of the image data. The expansion and composition unit expands and composites, in units of the band data, the plurality of pieces of image data color-converted and then compressed in units of the band data by the color conversion and compression unit. The image forming unit forms an image on the basis of the band data composited by the expansion and composition unit.

In another aspect of the present disclosure, an image forming method is performed by an image forming apparatus capable of compositing a plurality of pieces of image data. The image forming method includes the step of color-converting and then compressing each of the plurality of pieces of image data in units of band data, the band data being part of the image data. The method includes the step of expanding and compositing, in units of the band data, the plurality of pieces of image data color-converted and then compressed in units of the band data. The method includes the step of forming an image on the basis of the composited band data.

In yet another aspect of the present disclosure, an image forming program is performed by an image forming apparatus capable of compositing a plurality of pieces of image data. The image forming program causes the image forming apparatus to perform the step of color-converting and then compressing each of the plurality of pieces of image data in units of band data, the band data being part of the image data. The program causes the apparatus to perform the step of expanding and compositing, in units of the band data, the plurality of pieces of image data color-converted and then compressed in units of the band data. The program causes the apparatus to perform the step of forming an image on the basis of the composited band data.

BRIEF DESCRIPTION OF THE DRAWINGS

FIG. 7 is a flowchart of typical image composition processing.

DETAILED DESCRIPTION

Figure 1:
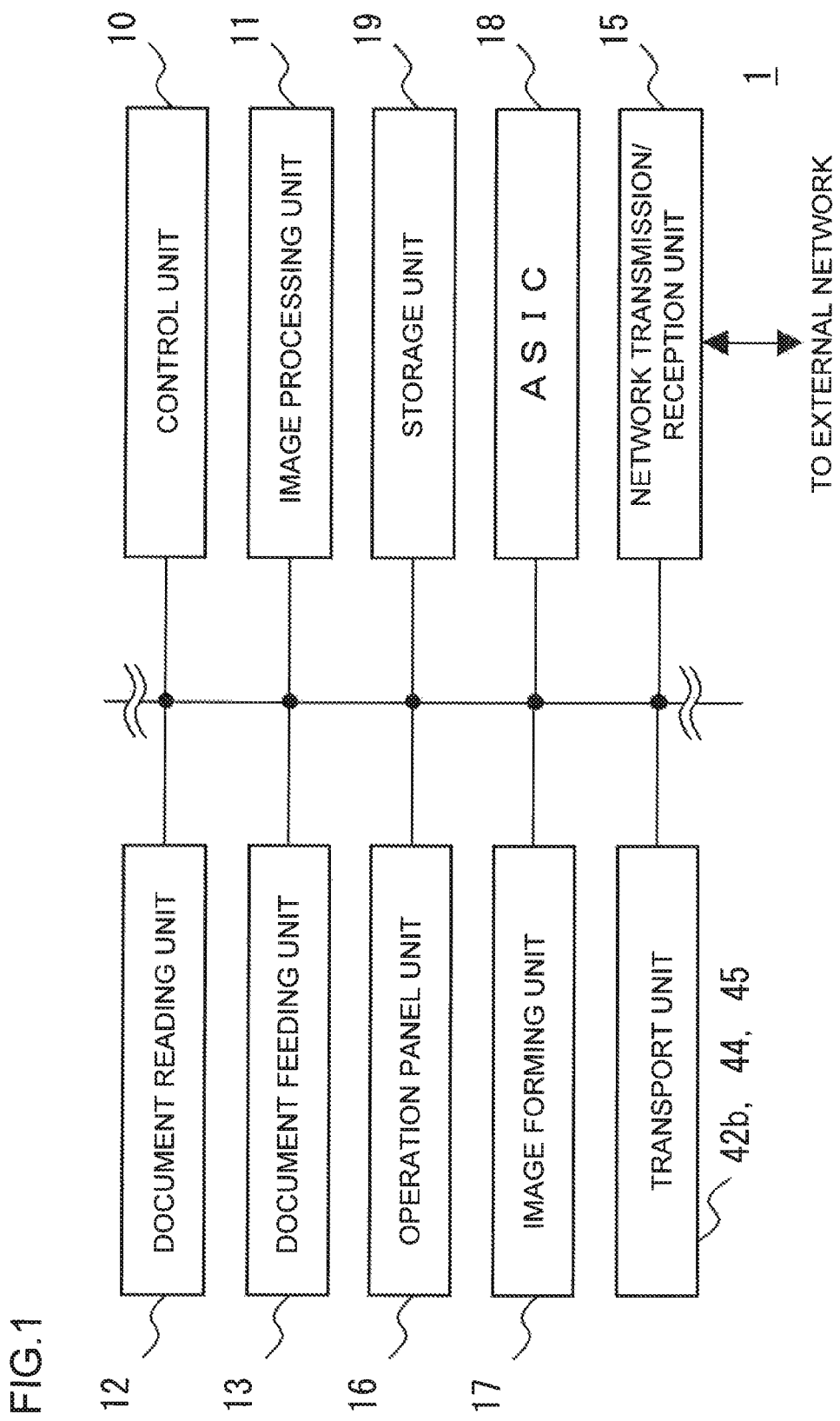
FIG. 1 shows the functional block configuration of an image forming apparatus according to an embodiment of the present disclosure.

The overall configuration of an image forming apparatus 1 will be described first with reference to FIG. 1.

The image forming apparatus 1 includes an image processing unit 11, a document reading unit 12, a document feeding unit 13, a transport unit (a paper feeding roller 42b, a pair of paper transport rollers 44, a pair of paper ejection rollers 45), a network transmission/reception unit 15, an operation panel unit 16, an image forming unit 17, an ASIC 18, and a storage unit 19, which are connected to a control unit 10. The control unit 10 controls the operations of the respective units.

The control unit 10 is an information processing unit, such as a general purpose processor (GPP), a central processing unit (CPU), a micro processing unit (MPU), a digital signal processor (DSP), a graphics processing unit (GPU), an ASIC, or the like.

The control unit 10 reads a control program stored in a read only memory (ROM) or a hard disk drive (HDD) in the storage unit 19, deploys the program on a random access memory (RAM) and executes it, so that it operates as units in functional blocks, which will be described later. The control unit 10 also performs overall control of the apparatus in accordance with prescribed instruction information input from the operation panel unit 16 and/or from an external terminal (not shown).

Figure 3:
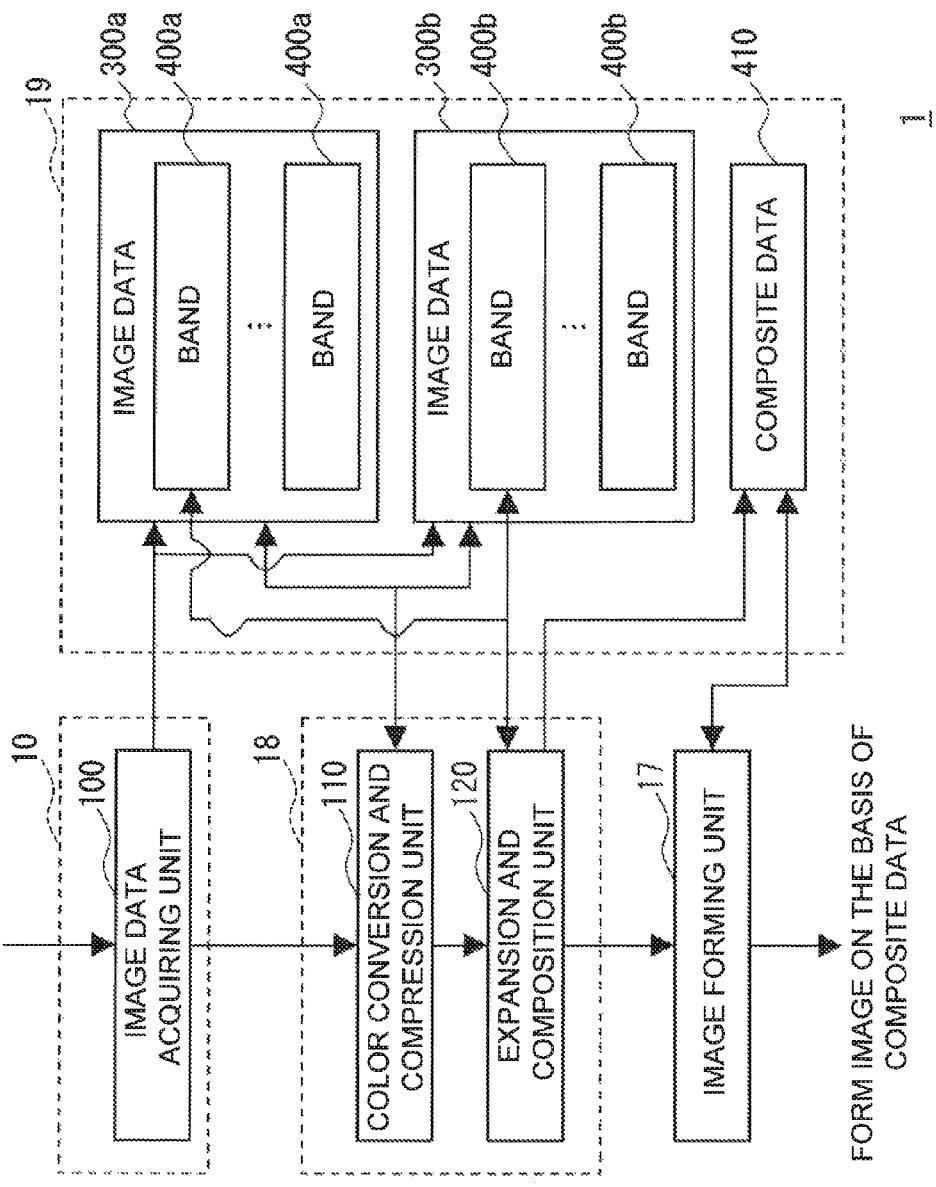
FIG. 3 shows the control block configuration of the image forming apparatus.

The image processing unit 11 is a control arithmetic unit such as a DSP, a GPU, or the like. The image processing unit 11 performs prescribed image processing on image data 300a, 300b (FIG. 3). The image processing includes, for example, scaling, density adjustment, gradation adjustment, and image enhancement.

The image processing unit 11 stores an image read by the document reading unit 12 in the storage unit 19 as print data. At this time, the image processing unit 11 may convert the print data into a file unit of PDF, TIFF, or other format.

The document reading unit 12 is a unit which reads (scans) a document that has been set.

The document feeding unit 13 is a unit which transports the document to be read by the document reading unit 12.

The image forming unit 17 is a unit which is operable, in response to an output instruction by a user, to form an image on a recording sheet on the basis of the data stored in the storage unit 19, the data read by the document reading unit 12, or the data acquired from an external terminal.

The transport unit (the paper feeding roller 42b, the paper transport roller pair 44, the paper ejection roller pair 45) serves to transport recording paper from a paper cassette 42a (FIG. 2) to the image forming unit 17 for image forming, and then transport the paper to a stack tray 50.

The operations of the document reading unit 12, the document feeding unit 13, the transport unit, and the image forming unit 17 will be described later.

The network transmission/reception unit 15 is a network connection unit which includes a LAN board, a radio transceiver, and/or other component for connecting to a LAN, a wireless LAN, a WAN, a mobile telephone network, and/or other external network.

The network transmission/reception unit 15 transmits and receives data on a data communication line and voice signals on a voice telephone line.

The operation panel unit 16 includes a display unit such as an LCD, and an input unit. The input unit includes a touch panel and buttons including a numeric keypad, a start button, a cancel button, buttons for switching operating modes among copying, FAX transmission, scanning and so on, and buttons for inputting instructions on execution of jobs such as printing, transmitting, saving, and recording a selected document.

The operation panel unit 16 acquires user instructions on various jobs of the image forming apparatus 1. Information on each user may be input or changed in accordance with a user instruction acquired through the operation panel unit 16.

The ASIC 18 is a dedicated processing unit such as an ASIC that performs color conversion, compression, expansion, composition, rotation, etc. on image data 300 (300a, 300b) stored in the storage unit 19. The ASIC 18 may be configured with a low-priced and moderate-performance circuit. All that is needed for the ASIC 18 is to perform the image processing in units of band data and at a speed fast enough to prevent the image forming from being interrupted when the ASIC 18 transmits the image data 300 to the image forming unit 17.

The ASIC 18 may additionally perform enlargement or reduction of the image data 300. Further, the ASIC 18 may be configured with a field-programmable gate array (FPGA). Alternatively, the ASIC 18 may be an MPU, a GPU, or a DSP which has a storage unit and executes a dedicated program. Still alternatively, the ASIC 18 may be configured with two or more ASICs or the like dedicated to corresponding image processing.

The storage unit 19 is a storage unit which employs recording media including a semiconductor memory such as a ROM or a RAM, and a HDD.

The ROM or HDD of the storage unit 19 stores a control program for controlling the operations of the image forming apparatus 1. The storage unit 19 also stores user account settings. The storage unit 19 may also include a document box area for each user.

In the image forming apparatus 1, the control unit 10 and the image processing unit 11 may be formed unitarily, in the form of a CPU with built-in GPU, or a chip-on-module package.

Further, the control unit 10 and the image processing unit 11 may each include a RAM, a ROM, and/or a flash memory.

Still further, the image forming apparatus 1 may include a FAX transmission/reception unit that performs facsimile transmission and reception.

Figure 2:
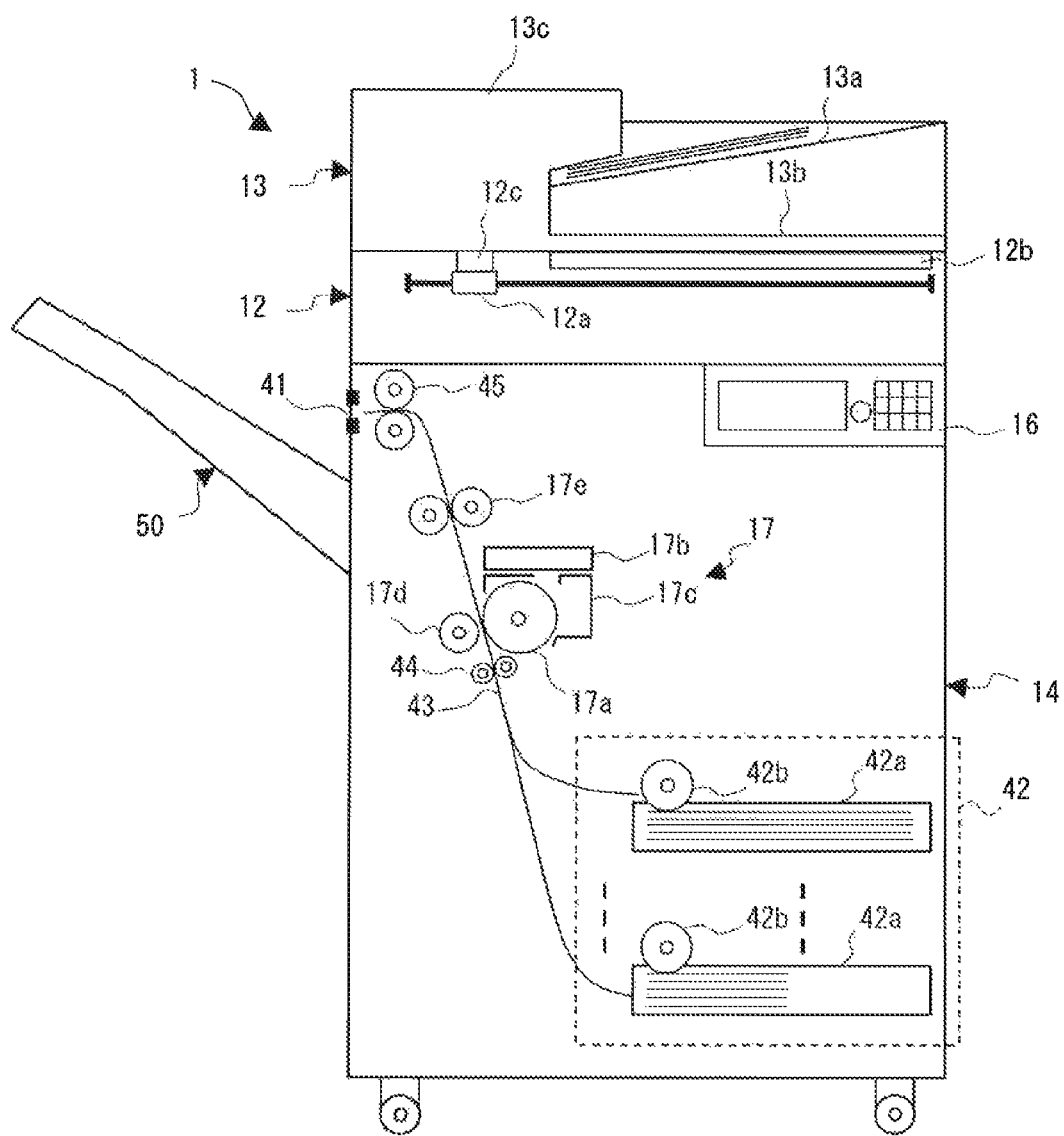
FIG. 2 schematically shows the configuration of the image forming apparatus.

The operations of the image forming apparatus 1 according to the embodiment of the present disclosure will now be described with reference to FIG. 2.

The document reading unit 12 is disposed in an upper portion of a main body unit 14. The document feeding unit 13 is disposed above the document reading unit 12. The stack tray 50 is arranged on the same side as a recording paper ejection port 41 formed in the main body unit 14. The operation panel unit 16 is disposed on the front side of the image forming apparatus 1.

The document reading unit 12 includes a scanner 12a, a platen glass 12b, and a document reading slit 12c. The scanner 12a includes an exposure lamp, a charge coupled device (CCD), a complementary metal oxide semiconductor (CMOS) imaging sensor, and so on, and is configured to be movable in the direction in which a document is transported by the document feeding unit 13.

The platen glass 12b is a document table made of a transparent member such as glass. The document reading slit 12c has a slit formed in the direction orthogonal to the direction in which a document is transported by the document feeding unit 13.

In the case of reading a document placed on the platen glass 12b, the scanner 12a is moved to a position facing the platen glass 12b, and scans and reads the document placed on the platen glass 12b to acquire image data 300. The scanner 12a outputs the acquired image data 300 to the control unit 10 (FIG. 1) disposed in the main body unit 14.

In the case of reading a document fed by the document feeding unit 13, the scanner 12a is moved to a position facing the document reading slit 12c, and reads the document through the document reading slit 12c in synchronization with the document transport operation performed by the document feeding unit 13, to acquire image data 300. The scanner 12a outputs the acquired image data 300 to the control unit 10 disposed in the main body unit 14.

The document feeding unit 13 includes a document placement unit 13a, a document ejection unit 13b, and a document transport mechanism 13c. The documents placed on the document placement unit 13a are picked up one by one and sequentially transported to the position facing the document reading slit 12c by the document transport mechanism 13c, and thereafter, they are ejected to the document ejection unit 13b.

The document feeding unit 13 is mounted pivotally. It can be pivotally lifted upward to uncover the upper surface of the platen glass 12b.

The main body unit 14 includes the image forming unit 17, and also includes a paper feeding unit 42, a paper transport path 43, the paper transport roller pair 44, and the paper ejection roller pair 45. The paper feeding unit 42 includes a plurality of paper cassettes 42a each storing sheets of recording paper different in size or orientation, and the paper feeding rollers 42b each feeding sheets of recording paper one by one from the corresponding paper cassette 42a onto the paper transport path 43. The paper feeding roller 42b, the paper transport roller pair 44, and the paper ejection roller pair 45 collectively function as the transport unit. The recording paper is transported by this transport unit.

The sheet of recording paper taken out by the paper feeding roller 42b onto the paper transport path 43 is transported to the image forming unit 17 by the paper transport roller pair 44. The sheet of recording paper on which an image has been recorded by the image forming unit 17 is ejected to the stack tray 50 by the paper ejection roller pair 45.

The image forming unit 17 includes a photoconductive drum 17a, an exposure unit 17b, a developing unit 17c, a transfer unit 17d, and a fixing unit 17e. The exposure unit 17b is an optical unit including a laser device, mirrors, lenses, and an LED array. With the photoconductive drum 17a primarily charged by a charging unit (not shown), the exposure unit 17b outputs a kind of light based on the image data 300 onto the photoconductive drum 17a for exposure, to thereby form an electrostatic latent image on the surface of the photoconductive drum 17a. The developing unit 17c is a developing unit that develops the electrostatic latent image formed on the photoconductive drum 17a with toner, whereby a toner image corresponding to the electrostatic latent image is formed on the photoconductive drum 17a. The transfer unit 17d transfers the toner image formed on the photoconductive drum 17a by the developing unit 17c onto recording paper. The fixing unit 17e applies heat to the recording paper with the toner image transferred thereon by the transfer unit 17d, to thereby fix the toner image on the recording paper.

The control configuration of the image forming apparatus 1 will now be described with reference to FIG. 3.

The control unit 10 of the image forming apparatus 1 includes an image data acquiring unit 100.

The ASIC 18 includes a color conversion and compression unit 110 and an expansion and composition unit 120.

The storage unit 19 stores image data 300a, 300b, and composite data 410. Hereinafter, one of the image data 300a, 300b will be simply referred to as image data 300. As for bands 400a and 400b included in the respective image data 300, one of the bands will be simply referred to as a band 400.

The image data acquiring unit 100 acquires image data 300 from the document reading unit 12, or from an external terminal or a recording medium (not shown), and stores the acquired image data in the storage unit 19.

The image data acquiring unit 100 may also analyze the page description language (PDL) of document data and draw it for conversion into image data 300.

The color conversion and compression unit 110 performs color conversion and then compression on each of a plurality of pieces of image data 300.

For example, the color conversion and compression unit 110 uses a look up table (LUT) to convert color image data 300 with 8 bits or 16 bits each for red, green, and blue (RGB), into color image data 300 with 8 bits each for cyan, magenta, yellow, and black (CMYK).

Further, the color conversion and compression unit 110 compresses the color-converted image data 300 in a prescribed format such as run-length encoding, Huffman coding, or JBIG. The compressed data can be expanded in units of data of bands 400 by the expansion and composition unit 120, which will be described below.

The expansion and composition unit 120 expands and composites the plurality of pieces of image data 300 color-converted and compressed by the color conversion and compression unit 110. At this time, the expansion and composition unit 120 expands and composites the data in units of data of bands 400, the band being part of the data.

As for the overlapping bits of the pieces of expanded image data 300, the expansion and composition unit 120 averages those bits by the number of pieces of image data 300 before composition. At this time, for example, the expansion and composition unit 120 may first binarize each image data 300 by dithering the images of the respective colors of C, M, Y, and K to generate binarized bands 400, and then composite the binarized bands 400 by using bit masks corresponding respectively thereto.

Further, the expansion and composition unit 120 causes the image forming unit 17 to form an image on the basis of composite data 410 which is the composited band data.

Image data 300 is data of images to be composited. The image data 300 may be, for example, image data 300 read by the document reading unit 12, print data acquired from another terminal or the like, or image data 300 bitmapped by rasterizing PDL.

The image data 300 may be of RGB colors or of CMYK colors. The number of bits for each color of the image data 300 is arbitrary. The image data 300 may be raw bitmap data, or may have been compressed in a prescribed format.

The number of pieces of image data 300 is not limited to two; two or more pieces of image data 300 can be composited.

Image data 300 includes bands 400 which are band data.

A band 400 is part of image data 300. The band 400 may be bitmap data of each color having a size (capacity) that the image forming unit 17 is capable of forming an image thereof at a time. The band 400 may also be raw, or may have been compressed in a prescribed format.

Composite data 410 is data obtained by compositing a plurality of bands 400. The composite data 410 is data in a unit of band data, corresponding to the band 400.

The composite data 410 may be raw bitmap data, as is the band 400. The composite data 410 may have the same size as the band 400.

The control unit 10 of the image forming apparatus 1 is caused to function as the image data acquiring unit 100 as the unit 10 executes the control program stored in the storage unit 19.

Further, the above-described units in the image forming apparatus 1 become hardware resources that carry out the image forming method of the present disclosure.

Figure 4:
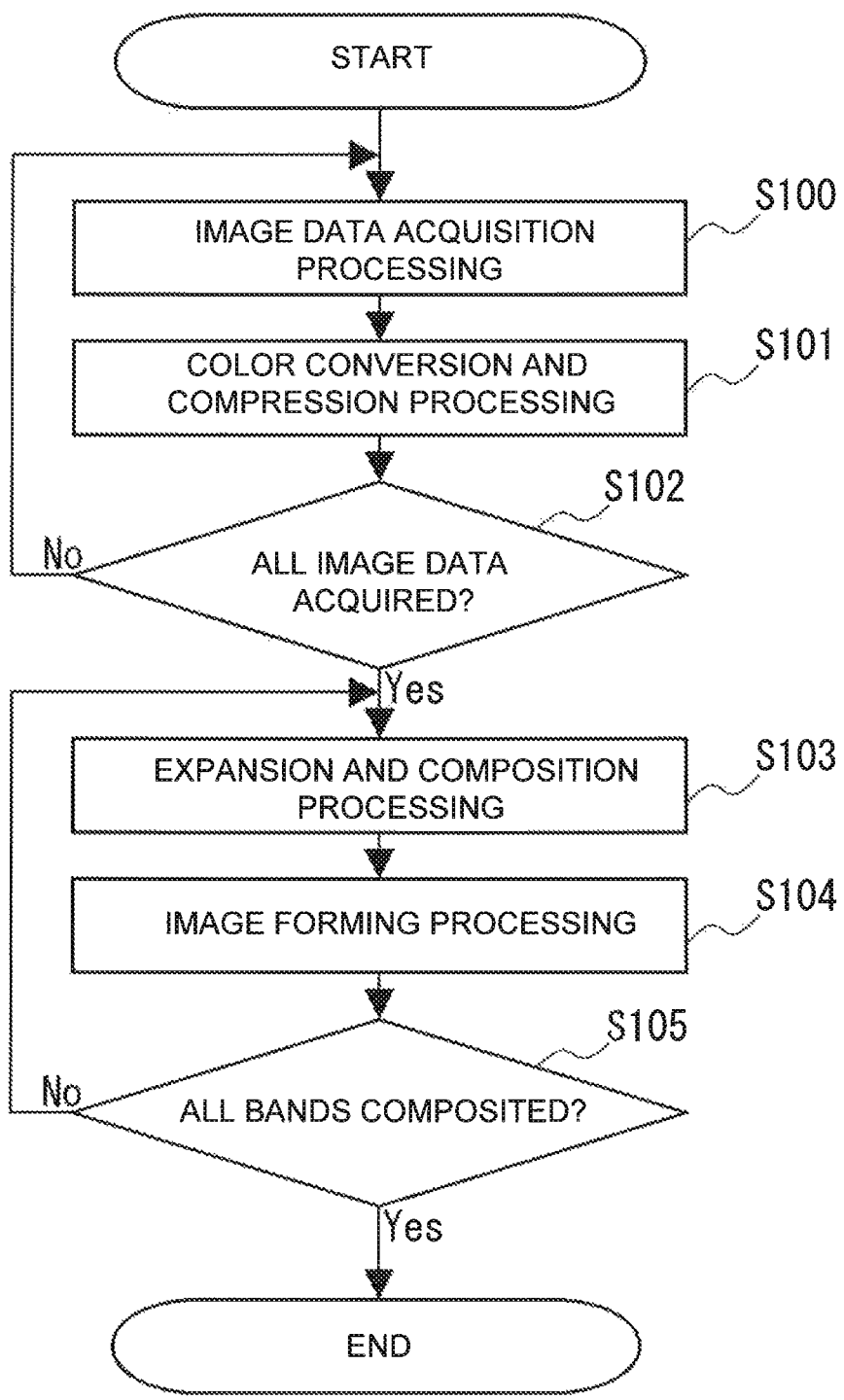
FIG. 4 is a flowchart of image composition processing according to an embodiment of the present disclosure.
Figure 5:
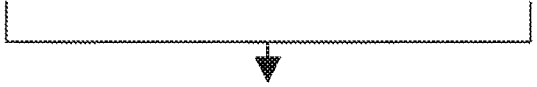
FIG. 5 shows the expansion and composition processing shown in FIG. 4.
Figure 6:
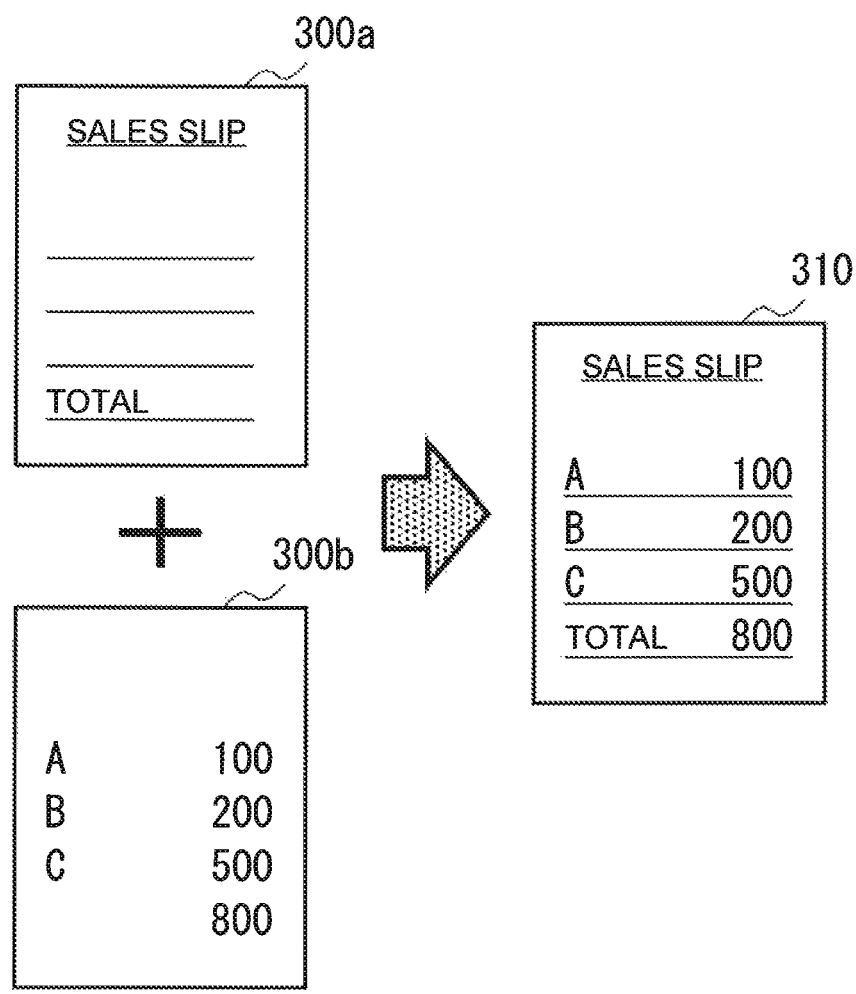
FIG. 6 shows typical image composition according to a related art.

Image composition processing performed by the image forming apparatus 1 according to an embodiment of the present disclosure will now be described with reference to FIGS. 4 and 5.

In the image composition processing of the present embodiment, image data 300*a*, 300*b* are acquired, and color-converted and compressed. The compressed image data 300*a*, 300*b* are expanded and composited in units of data of bands 400*a*, 400*b*, so that composite data 410 is generated. Thereafter, an image is formed on the basis of the composite data 410.

To carry out the image composition processing of the present embodiment, the control unit 10 executes a program stored in the storage unit 19 and uses the hardware resources to carry out the processing in cooperation with the ASIC 18 and other units.

Details of the image composition processing of the present embodiment will now be described step by step with reference to the flowchart in FIG. 4.

<Step S100>

First, the control unit 10 functions as the image data acquiring unit 100 to perform image data acquisition processing.

The control unit 10 may cause the document reading unit 12 to read a document set on the document feeding unit 13 to acquire the image as the image data 300.

Alternatively, the control unit 10 may acquire the image data 300 already existing in a user storage folder in the storage unit 19 or in a connected recording medium.

Still alternatively, the control unit 10 may acquire the image data 300 from a storage folder in another terminal or server through a network, or may acquire image data received by facsimile as the image data 300.

The control unit 10 stores the acquired image data 300 in the storage unit 19. At this time, the control unit 10 may convert the image data 300 into bitmap data or the like.

<Step S101>

Next, the color conversion and compression unit 110 performs color conversion and compression processing.

The control unit 10 performs color conversion on the acquired image data 300, and then compresses the resultant data.

For example, the control unit 10 reads the image data 300 from the storage unit 19 in units of band data, and uses a LUT or the like to perform color conversion from RGB colors to CMYK colors. The control unit 10 compresses the converted bands 400 in a prescribed format, and then replaces the data of the bands 400 before the color conversion in the image data 300 with the color-converted and compressed data.

With this configuration, it becomes unnecessary to prepare a work memory for the entire image data 300 at a time, and it is thus possible to reduce the capacity of the work memory required for the color conversion and compression.

<Step S102>

Next, the control unit 10, functioning as the image data acquiring unit 100, determines whether it has acquired all pieces of image data 300. If all the pieces of image data 300 have been acquired, the control unit 10 determines "Yes"; otherwise, the control unit 10 determines "No".

If the control unit 10 determines "No", the process returns to step S100.

If the control unit 10 determines "Yes", the process proceeds to step S103.

<Step S103>

After all the pieces of image data 300 have been acquired, the expansion and composition unit 120 performs expansion and composition processing.

The expansion and composition unit 120 expands the bands 400 in the pieces of image data 300 color-converted and compressed by the color conversion and compression unit 110, and composites the resultant bands. At this time, for example, the expansion and composition unit 120 averages the bits in the data of the expanded bands 400 by the number of pieces of the image data 300 before composition.

This processing will be described more specifically with reference to FIG. 5. For example, the expansion and composition unit 120 reads bands 400 located in the same positions in the respective pieces of image data 300 to be composited. The expansion and composition unit 120 then expands the read bands and converts them into bitmap data before compositing them. At this time, for example, the expansion and composition unit 120 generates bitmap data by binarizing color data of the respective colors by dithering. The expansion and composition unit 120 then ANDs the bitmap data with bit masks for the respective bands 400. The expansion and composition unit 120 can average the bits by ORing those outputs, for example. In the example in FIG. 5, a mask a for the band 400*a* and a mask b for the band 400*b*, which are the one's complement of each other, are prepared and used to obtain outputs a and b. These outputs a and b are then ORed to obtain composite data 410.

With this configuration, quantization errors can be reduced, and the image data 300 after the composition can be improved in appearance. Such reduction in errors is noticeable particularly in the case of compositing image data 300 which is binary in nature, such as data received by facsimile, with image data 300 of a plurality of colors. This means that, even when those images are composited, the text included in the facsimile image is easy to read.

<Step S104>

Next, the image forming unit 17 performs image forming processing.

The image forming unit 17 forms an image on a sheet of recording paper on the basis of the composite data 410.

At this time, the image of the composite data 410 can be formed in the same manner as that of an ordinary band 400.

It may be configured to cause the control unit 10 to delete the composite data 410 after the image has been formed.

<Step S105>

Next, the expansion and composition unit 120 determines whether all bands 400 have been composited. If all the bands 400 in the pieces of image data 300 have been composited and output, the expansion and composition unit 120 determines "Yes"; otherwise, it determines "No".

If the expansion and composition unit 120 determines "Yes", the image composition processing is terminated.

If the expansion and composition unit 120 determines "No", the process returns to step S103, where other bands 400 are composited. In the case where there is more than one page, the similar processing can be performed on a per-page basis.

In the above-described manner, the image composition processing according to the embodiment of the present disclosure is completed.

The above configurations can provide the following effects.

In a conventional image forming apparatus, for compositing images, pieces of acquired image data 300 were compressed and expanded one by one, and then composited and output on a per-image basis. This involved futile processing and required a large-capacity work memory.

In contrast, the image forming apparatus 1 according to the embodiment of the present disclosure is capable of compositing a plurality of pieces of image data 300 and includes: the color conversion and compression unit 110 that color-converts and then compresses each of the plurality of pieces of image data 300 in units of data of bands 400, the band being part of the image data 300; the expansion and composition unit 120 that expands and composites, in units of data of the bands 400, the plurality of pieces of image data 300 color-converted and then compressed by the color conversion and compression unit 110; and the image forming unit 17 that forms an image on the basis of composite data 410 which is the data of the bands 400 composited by the expansion and composition unit 120.

With this configuration, as compared to the conventional image forming apparatus, it is possible to reduce unproductive processing and save the usage of the work memory. It becomes unnecessary to prepare ASICs dedicated to different processing, and it is possible to save the storage capacity of the storage unit 19 and reduce the cost. It is also possible to improve the performance during the image composition processing.

The composited image data 300 is not stored on a per-image basis. This makes hacking (e.g., extracting composite data 410 from the storage unit 19) difficult, so security can be ensured.

Further, in the image forming apparatus 1 according to the embodiment of the present disclosure, the expansion and composition unit 120 performs the composition after averaging overlapping bits in the respective pieces of the expanded image data 300 by the number of pieces of the image data 300.

With this configuration, the ASIC 18 for data compression and expansion, the throughput of which is not so high, can be used to perform the composition processing, leading to reduced cost.

In the embodiment of the present disclosure, two pieces of image data 300a and 300b were composited. However, it is also possible to composite two or more pieces of image data 300.

In such a configuration, in the case of averaging the bits in the same manner as in the above-described expansion and composition processing, a mask of a value that, when ORed, yields "−1" in two's complement, i.e. "0xFF" in hexadecimal notation ("11111111b" in binary notation) in the case of eight bits, may be prepared for each of the two or more pieces of image data 300.

With this configuration, a plurality of pieces of image data 300 can be composited rapidly and efficiently, leading to reduced cost.

Further, in the above embodiment, for simplification of explanation, it was assumed that only two kinds of masks were prepared. However, different masks may be used depending on, for example, the line positions of the bands 400. For example, it may be configured such that masks a and b are used for the bands 400a and 400b, respectively, in even-numbered lines, and such that the masks b and a are used for the bands 400a and 400b, respectively, in odd-numbered lines. Further, a mask of a pattern having a prescribed size may be prepared. In this case, the use of a mask having the size of a power of two, such as 128 bits×128 bits, for example, enables high-speed processing.

With this configuration, it is possible to suppress the occurrence of moire caused by composition of bits and, thus, to improve the display quality.

Further, in the above embodiment, the bits were averaged for each color after application of dithering.

Alternatively, the expansion and composition unit 120 may be configured to average the bits for each gradation level for each color before application of dithering. For example, in the case where each color is of 8-bit gradation, the expansion and composition unit 120 may OR the bits of each color and then shift the bits by one to the right for averaging. Still alternatively, the expansion and composition unit 120 may compress the gradation levels before image forming. For example, for each image data 300, the expansion and composition unit 120 may acquire the upper four bits out of the eight bits for each color and OR them, and then shift the bits by one to the right to thereby obtain composite data 410 of 4-bit gradation. Thereafter, the expansion and composition unit 120 may expand the data into eight bits through gradation correction at the time of image forming.

With this configuration, the processing load on the ASIC can be reduced, enabling high-speed image forming.

Further, in the above embodiment, the image composition was carried out in the ASIC 18. Alternatively, the similar processing may be carried out in the image processing unit 11, or some of the processing may be carried out in the control unit 10. In this case, accelerating processing by the GPU or the like of the control unit 10 may be performed.

The present disclosure is also applicable to information processing apparatuses other than the image forming apparatuses. Specifically, it is applicable to the configuration which uses, for example, a server to which a network scanner or a scanner is connected via a USB or the like. Further, the present disclosure is also applicable to the configuration in which, after the composition of the acquired image data 300, the resultant data is converted to a file or the like, without being subjected to image forming.

It should be noted that the configurations and operations in the above embodiment are merely illustrative; they may be appropriately modified for implementation without departing from the scope of the present disclosure.

What is claimed is:

1. An image forming apparatus capable of compositing a plurality of pieces of image data, the apparatus comprising:
   a storage unit;
   a color conversion and compression unit that reads the plurality of pieces of image data from the storage unit in units of band data, color-converts each of the plurality of pieces of image data in units of the band data using a LUT from RGB colors to CMYK colors, and then compresses each of the plurality of pieces of image data in units of the band data, the band data being part of the image data;
   an image data acquiring unit that determines whether all the plurality of pieces of image data have been acquired,
   an expansion and composition unit that expands and composites, in units of the band data, the plurality of pieces of image data color-converted and then compressed in units of the band data by the color conversion and compression unit, if all the plurality of pieces of image data have been acquired; and
   an image forming unit that forms an image on the basis of the band data composited by the expansion and composition unit,
   wherein the expansion and composition unit performs the composition after averaging overlapping bits in the respective pieces of the expanded image data by the number of pieces of the image data,
   wherein the expansion and composition unit reads the band data located in the same positions in the respective pieces of image data to be composited, then expands the read band data, and converts them into bitmap data before compositing them, and wherein the expansion and composition unit generates bitmap data by binarizing color data of the respective colors by dithering, then ANDs the bitmap data with bit masks for the respective band data, and averages the bits by ORing output of the bitmap data with the bit masks.

2. An image forming method performed by an image forming apparatus including a storage unit capable of compositing a plurality of pieces of image data, the method comprising:

reading the plurality of pieces of image data from the storage unit in units of band data;

color-converting each of the plurality of pieces of image data in units of the band data using a LUT from RGB colors to CMYK colors;

compressing each of the plurality of pieces of image data in units of the band data, the band data being part of the image data;

determining whether all the plurality of pieces of image data have been acquired;

expanding and compositing, in units of the band data, the plurality of pieces of image data color-converted and then compressed in units of the band data, if all the plurality of pieces of image data have been acquired; and forming an image on the basis of the composited band data, wherein the expanding and compositing includes performing the composition after averaging overlapping bits in the respective pieces of the expanded image data by the number of pieces of the image data, wherein the expanding and compositing includes reading the band data located in the same positions in the respective pieces of image data to be composited, then expanding the read band data, converting them into bitmap data before compositing them, and wherein the expanding and compositing includes generating bitmap data by binarizing color data of the respective colors by dithering, then ANDing the bitmap data with bit masks for the respective band data, and averaging the bits by ORing output of the bitmap data with the bit masks.

* * * * *